United States Patent [19]
Kaufman et al.

[11] 3,954,063
[45] May 4, 1976

[54] NOVEL INHIBITOR SYSTEM FOR DOUBLE-BASE PROPELLANT

[75] Inventors: Martin H. Kaufman, China Lake; Bernard Wasserman, Ridgecrest, both of Calif.

[73] Assignee: The United States of America as represented by the Secretary of the Navy, Washington, D.C.

[22] Filed: Dec. 9, 1974

[21] Appl. No.: 530,916

[52] U.S. Cl. .............................. 102/103; 156/331; 260/859 PV; 264/3 R
[51] Int. Cl.² ........................................ F42B 9/14
[58] Field of Search ................ 102/103; 264/3 R; 156/187, 331; 260/859 PV

[56] References Cited
UNITED STATES PATENTS

| | | |
|---|---|---|
| 3,024,216 | 3/1962 | Smitmans et al. ............ 260/589 PV |
| 3,442,744 | 5/1969 | Teter et al. ..................... 102/103 X |
| 3,703,868 | 11/1972 | Braak................................... 102/103 |
| 3,734,982 | 5/1973 | Sampson......................... 156/331 X |
| 3,873,640 | 3/1975 | Owston et al.................... 156/331 X |
| 3,887,757 | 6/1975 | Stone et al....................... 156/331 X |

*Primary Examiner*—Edward A. Miller
*Attorney, Agent, or Firm*—R. S. Sciascia; Roy Miller; Lloyd E. K. Pohl

[57] ABSTRACT

An inhibitor for double-base propellant consisting essentially of a layer of Saran or polystyrene bonded to the propellant grain by means of a block copolymer containing vinyl chloride-vinylidene chloride blocks or polystyrene blocks and polyurethane blocks.

4 Claims, No Drawings

NOVEL INHIBITOR SYSTEM FOR DOUBLE-BASE PROPELLANT

BACKGROUND OF THE INVENTION

1. Field of the Invention

This invention relates to inhibitors for double-base propellants.

2. Description of the Prior Art

Nitroglycerine is a major ingredient of all double-base propellants. When double-base propellants are stored for any length of time, nitroglycerine tends to migrate to the surface. Inhibitor layers are applied to the surface of double-base propellant grains in order to provide controlled burning surface area for designed ballistic performance. The nitroglycerine migrates into this inhibitor, depleting the propellant and affecting its ballistic properties. The properties of the inhibitor also deteriorate physically as more and more nitroglycerine plasticizes the material.

Over the past 25 or 30 years, a great deal of money and effort has been expended in attempts to find ways in which suitable inhibitor materials, i.e., materials which are impervious to nitroglycerine, could be adhered to double-base propellant grains. This has proven to be a difficult problem. Many materials have been tried but most of those which could be bound, by means of adhesive, to a double-base propellant grain have proven either to be pervious to unacceptably large amounts of nitroglycerine or, in many cases, the adhesive itself took up nitroglycerine and softened, resulting in low cohesive strength. The latter is a dangerous situation for when the pressure increases due to propellant ignition the weak adhesive layer can part from the propellant surface. If this happens a large increase in burning area, beyond the design of the rocket, is provided. The usual result is a rocket motor blowup.

At the present time, ethyl cellulose and various cellulose acetates are most widely used as inhibitor materials. Ethyl cellulose picks up from 15 to 30 percent nitroglycerine, high acetyl cellulose acetate dissolves in nitroglycerine and medium or low acetyl cellulose acetate picks up high percentages of nitroglycerine.

SUMMARY OF THE INVENTION

According to this invention, either Saran or polystyrene, both of which are substantially impervious to nitroglycerine are bound, by means of an adhesive, to the surface of a double-base propellant to inhibit the propellant. In the case of Saran, a block copolymer containing blocks of vinyl chloride-vinylidene chloride copolymer and blocks of polyurethane is used as the adhesive. In the case where polystyrene is used, a block copolymer containing blocks of polystyrene and blocks of polyurethane is used as the adhesive.

DESCRIPTION OF THE PREFERRED EMBODIMENT

Saran is a well known and widely used product. It is a copolymer of vinyl chloride and vinylidene chloride.

Polystyrene is also a well known and widely used product. It is, of course, a polymer of styrene.

Both Saran and polystyrene are relatively impervious to nitroglycerine. Both Saran and polystyrene are available in sheet and film forms and both may be used in solutions and may also be processed as melts. It is, accordingly, the foremost objective of this invention to provide an inhibitor for a double-base propellant consisting essentially of either a layer (or sheet) of Saran or a layer (or sheet) of polystyrene bound to the propellant grain by means of a suitable adhesive which maintains its cohesive strength in the presence of nitroglycerine.

It has been found that, in the case where Saran is adhesively attached to the propellant, a block copolymer containing blocks of vinyl chloride-vinylidene chloride copolymer and blocks of polyurethane is a suitable adhesive.

It has been found that, in the case where polystyrene is adhesively attached to the propellant, a block copolymer containing blocks of polystyrene and blocks of polyurethane is a suitable adhesive.

Vinyl chloride-vinylidene chloride copolymer having one end hydroxlated can be prepared according to the following example.

EXAMPLE 1

Vinylidene chloride (38 g), 12 g of vinyl chloride, 75 ml of water 0.75 ml of 30% hydrogen peroxide, 1 g of sodium lauryl sulfate and 1 g of diammonium phosphate were mixed and heated for 24 hours at 48°C in a rocker bomb. The resulting product was filtered and dried and proved to be a vinyl chloride-vinylidene chloride copolymer.

Polyurethane can be prepared according to the following example.

EXAMPLE 2

Toluene diisocyanate (34.8 g), 1, 4-butanediol (17.1 g) and tetrahydrofuran (150 ml) were mixed. After 2 hours, 2 drops of dibutyltin dilaurate were added. The reaction mixture was then allowed to react for 3 days at ambient temperature.

Hydroxy terminated polystyrene can be prepared according to the following example.

EXAMPLE 3

Benzene (50 ml), tetrahydrofuran (50 ml), and 5.7 ml of butyl lithium solution (1.6 M in hexane) were mixed. Styrene (50 ml) was added slowly and the viscosity increased indicating polymerization was taking place. Ethylene oxide was bubbled in until the red color disappeared. A few drops of dilute hydrochloric acid were added, the reaction mixture was poured into methanol, filtered and dried. The recovered solid proved to be hydroxy terminated polystyrene.

A block copolymer containing blocks of vinyl chloride-vinylidene chloride copolymer and blocks of polyurethane may be prepared according to the following example.

EXAMPLE 4

Vinyl chloride-vinylidene chloride (23 g from Example 1) was dissolved in 150 ml of tetrahydrofuran. Seven milliliters of polyurethane solution (the product in Example 2) was added. Dibutyltin dilaurate (10 drops) was added and the reaction mixture was reacted for 6 days until isocyanate was no longer detectable at ambient temperature. The resulting reaction mixture was then poured into methanol whereupon a precipitate formed. The precipitate was then dissolved in hot tetrahydrothiophene - 1, 1-dioxide. Upon cooling a precipitate formed. Upon recovery and analysis, this precipitate proved to be a block copolymer having the aforementioned blocks.

A block copolymer containing polystyrene blocks and polyurethane blocks can be prepared according to the following example.

EXAMPLE 5

Polystyrene (10 g from Example 3) and 37 ml of polyurethane solution (reaction product of Example 2) were reacted in a mixture of tetrahydrofuran and dimethylacetamide (1 part THF per 4 parts dimethylacetamide by volume) in the presence of a few drops of dibutyltin dilaurate. The reaction was carried out until isocyanate was no longer detectable at ambient temperature. The reaction product was then precipitated in methonol (as in Example 4), extracted with benzene and extracted with tetrahydrothiophene - 1, 1-dioxide. The product, upon analysis, proved to be a block copolymer having the aforementioned blocks.

To bond Saran to a double-base propellant grain one can dissolve the block copolymer from Example 4 in tetrahydrofuran, apply the resulting lacquer to the surface of the propellant grain, allow the solvent (tetrahydrofuran) to evaporate until only a tacky coating of the block copolymer remains on the propellant grain surface and then apply a sheet of Saran. In a few hours, a very strong bond is formed. It is theorized that the vinyl chloride-vinylidene chloride blocks intermingle with the Saran, which is, as related above, a copolymer of vinyl chloride and vinylidene chloride, and that the polyurethane blocks react with the material at the propellant surface. This has, however, not been proven. What has been proven is that the Saran is impervious to the nitroglycerine in the propellant and is tightly bound to the surface of the propellant by means of the block copolymer adhesive thereby forming an excellent inhibitor.

To bond polystyrene to a double-base propellant surface one may use a lacquer prepared from tetrahydrofuran and the block copolymer of Example 5 in the manner described in the preceeding paragraph.

It is perceived that, in addition to bonding Saran or polystyrene layers to double-base propellant grains as described above, other inhibitor materials could be bound in a similar manner. For example, ethylene propylene rubber could be bound to a double-base propellant grain with a block copolymer containing blocks of ethylene propylene copolymer and blocks of polyurethane.

What is claimed is:

1. An inhibitor for a double-base rocket propellant grain consisting essentially of a layer of vinyl chloride-vinylidene chloride copolymer bonded to the surface of said grain by means of a block copolymer adhesive containing blocks of vinyl chloride-vinylidene chloride copolymer and blocks of polyurethane.

2. An inhibitor for a double-base rocket propellant grain consisting essentially of a layer of polystyrene bonded to the surface of said grain by means of a block copolymer adhesive containing blocks of polystyrene and blocks of polyurethane.

3. A method for bonding a sheet of vinyl chloride-vinylidene chloride copolymer to a solid double-base rocket propellant grain comprising the steps of:
   a. preparing a lacquer by dissolving a block copolymer containing blocks of vinyl chloride-vinylidene chloride copolymer and blocks of polyurethane in tetrahydrofuran;
   b. applying said lacquer to the surface of said grain;
   c. allowing the tetrahydrofuran to evaporate until a tacky layer of said block copolymer remains on the surface of said grain; and
   d. applying a layer of vinyl chloride-vinylidene chloride copolymer to said tacky layer.

4. A method for bonding a sheet of polystyrene to a solid double-base rocket propellant grain comprising the steps of:
   a. preparing a lacquer by dissolving a block copolymer containing blocks of polystyrene and blocks of polyurethane in tetrahydrofuran;
   b. applying said lacquer to the surface of said grain;
   c. allowing the tetrahydrofuran to evaporate until a tacky layer of said block copolymer remains on the surface of said grain; and
   d. applying a layer of polystyrene to said tacky layer.

* * * * *